United States Patent
He et al.

(10) Patent No.: US 12,422,952 B2
(45) Date of Patent: Sep. 23, 2025

(54) TOUCH DETECTION CIRCUIT

(71) Applicant: HIMAX TECHNOLOGIES LIMITED, Tainan (TW)

(72) Inventors: Jia-Ming He, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/408,536

(22) Filed: Jan. 9, 2024

(65) Prior Publication Data

US 2025/0224835 A1    Jul. 10, 2025

Related U.S. Application Data

(60) Provisional application No. 63/537,823, filed on Sep. 12, 2023.

(51) Int. Cl.
*G06F 3/041* (2006.01)
*G06F 3/044* (2006.01)

(52) U.S. Cl.
CPC ........ *G06F 3/0418* (2013.01); *G06F 3/04166* (2019.05); *G06F 3/0446* (2019.05)

(58) Field of Classification Search
CPC .. G06F 3/0446; G06F 3/04166; G06F 3/0412; G06F 3/0416; G06F 3/044; G06F 3/0443; G06F 3/0445; G06F 3/04886; G06F 3/04182; G06F 3/04184
See application file for complete search history.

(56) References Cited

U.S. PATENT DOCUMENTS

| | | | |
|---|---|---|---|
| 2014/0198053 A1 | 7/2014 | Yoon et al. | |
| 2016/0098118 A1* | 4/2016 | Lin | G06F 3/0446 |
| | | | 345/174 |
| 2016/0117051 A1* | 4/2016 | Han | G06F 3/04166 |
| | | | 345/173 |
| 2017/0090616 A1* | 3/2017 | Ahsan | G06F 3/0446 |
| 2019/0324584 A1* | 10/2019 | Son | G06F 3/0418 |
| 2020/0393949 A1* | 12/2020 | Kim | G06F 3/044 |
| 2022/0326831 A1 | 10/2022 | Lee et al. | |
| 2024/0241598 A1* | 7/2024 | Kim | G06F 3/0446 |

FOREIGN PATENT DOCUMENTS

| | | |
|---|---|---|
| CN | 115543118 | 12/2022 |
| KR | 20180076512 | 7/2018 |
| TW | 201506894 | 2/2015 |

OTHER PUBLICATIONS

"Search Report of Europe Counterpart Application", issued on Mar. 20, 2025, p. 1-p. 9.
"Office Action of Taiwan Counterpart Application", issued on Jul. 28, 2025, p.1-p. 8.

* cited by examiner

*Primary Examiner* — Sujit Shah
(74) *Attorney, Agent, or Firm* — JCIPRNET

(57) ABSTRACT

A touch detection circuit includes a plurality of driving signal generators. The driving signal generators are divided into a plurality of driving signal generator groups, and each of the driving signal generator groups comprises at least one of the driving signal generators. The driving signal generators respectively generate a plurality of driving signals, and a frequency of each of the driving signals in one of the driving signal generator groups is different from a frequency of each of the driving signals in another one of the driving signal generator groups.

11 Claims, 7 Drawing Sheets

TOUCH DETECTION CIRCUIT

BACKGROUND

Technical Field

The disclosure relates to a touch detection circuit, and more particularly, to the touch detection circuit which can reduce noise interference.

Description of Related Art

In today's electronic products, touch detection circuits are essential circuits for most products. For example, as mobile phones become thinner and thinner, the distance between touch panels and display panels is getting closer and closer. Noise introduced is getting louder and louder, and the touch detection circuit is more susceptible to interference.

SUMMARY

The disclosure provides a touch detection circuit which can short a time for a touch sensing operation and improve a signal to noise ratio (SNR) of touch sensing signals.

The touch detection circuit includes a plurality of driving signal generators. The driving signal generators are divided into a plurality of driving signal generator groups, and each of the driving signal generator groups comprises at least one of the driving signal generators. The driving signal generators respectively generate a plurality of driving signals, and a frequency of each of the driving signals in one of the driving signal generator groups is different from a frequency of each of the driving signals in another one of the driving signal generator groups.

Based on the above, the driving signal generator of the touch detection circuit is configured to generate the driving signal witch swings between a positive voltage and a negative voltage. That is, a rise magnitude of the driving signal from a disable status to an enable status of the driving signal generator may be reduced. Such as that, an interference of low frequency noise is reduced, and performance of a touch sensing device can be enhanced.

DETAILED DESCRIPTION OF DISCLOSED EMBODIMENTS

Figure 1:
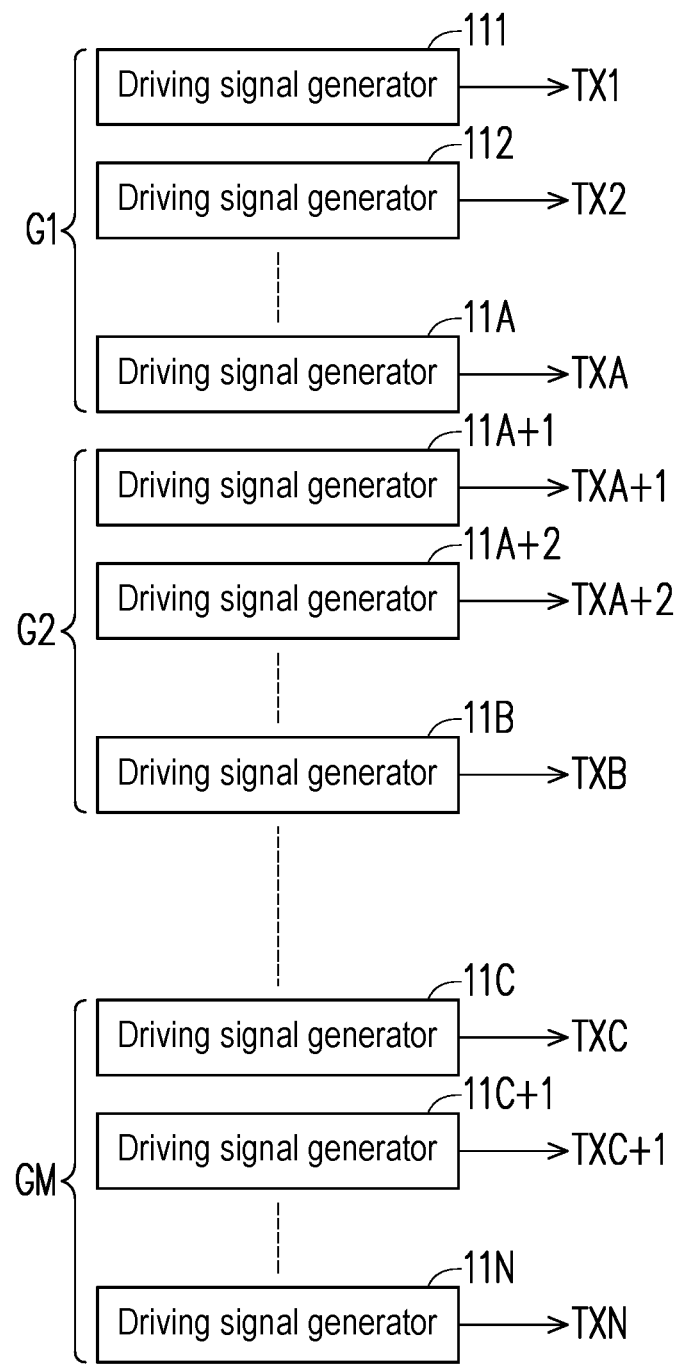
FIG. 1 illustrates a schematic diagram of a touch detection circuit according to an embodiment of present disclosure.

Please refer to FIG. 1, which illustrates a schematic diagram of a touch detection circuit according to an embodiment of present disclosure. The touch detection circuit 100 includes a plurality of driving signal generators 111 to 11N. The driving signal generators 111 to 11N may be divided into a plurality of driving signal generator groups G1 to GM. In here, each of the driving signal generator groups G1 to GM includes one or more driving signal generators 111 to 11N. For example, the driving signal generator group G1 includes the driving signal generators 111 to 11A; the driving signal generator group G1 includes the driving signal generators 11A+1 to 11B; . . . ; and the driving signal generator group GM includes the driving signal generators 11C+1 to 11N.

On the other hand, the driving signal generators 111 to 11N respectively generate a plurality of driving signals TX1 to TXN. A frequency of each of the driving signals TX1 to TXN in one of the driving signal generator groups G1 to GM is different from a frequency of each of the driving signals TX1 to TXN in another one of the driving signal generator groups G1 to GM.

In detail, in this embodiment, the driving signals TX1 to TXA corresponding to the same driving signal generator group G1; the driving signals TXA+1 to TXB corresponding to the same driving signal generator group G2; . . . ; and the driving signals TXC to TXN corresponding to the same driving signal generator group GM. Frequencies of the driving signals TX1 to TXA corresponding to the same driving signal generator group G1 may be same and equal to a first frequency; frequencies of the driving signals TXA+1 to TXB corresponding to the same driving signal generator group G2 may be same and equal to a second frequency; . . . ; and frequencies of the driving signals TXC to TXN corresponding to the same driving signal generator group GM may be same and equal to a Mth frequency, wherein any two of the first frequency to the Mth frequency are different.

Figure 2:
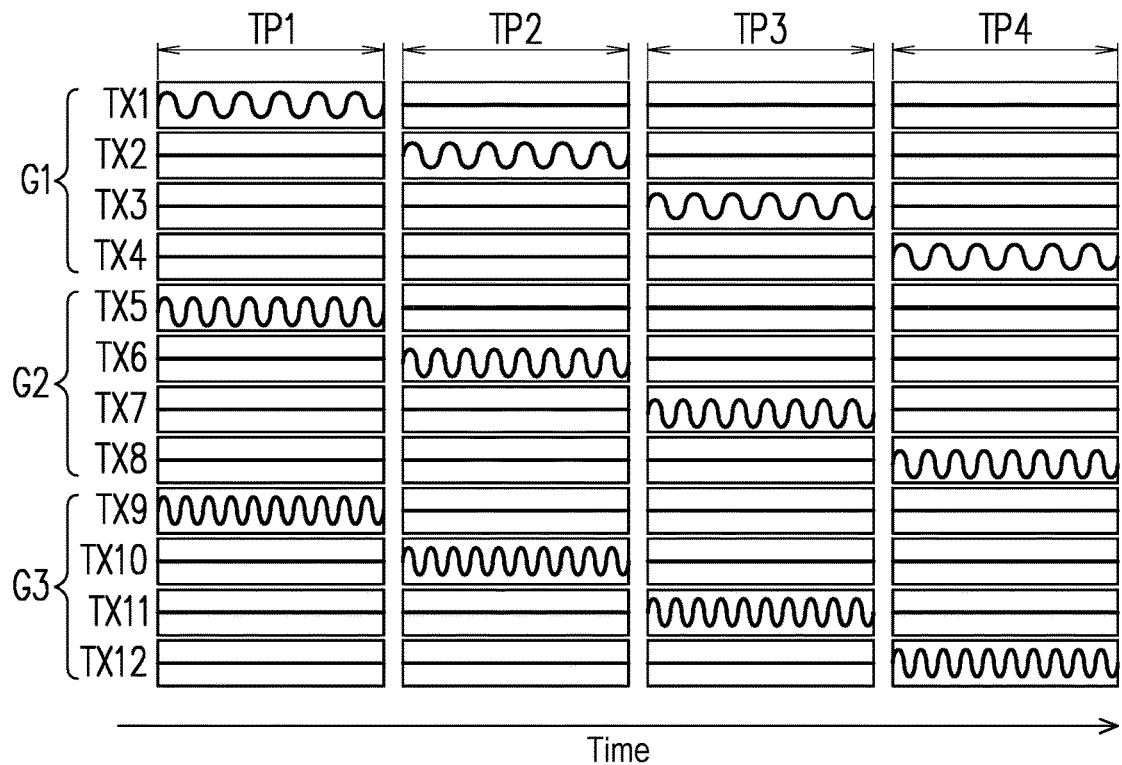
FIG. 2 illustrates waveform plots of driving signals generated by driving signal generators of touch detection circuit according to an embodiment of present disclosure.

Please refer to FIG. 2 commonly, which illustrates waveform plots of driving signals generated by driving signal generators of touch detection circuit according to an embodiment of present disclosure. In FIG. 2, a plurality of driving signals TX1 to TX12 are generated by a plurality of driving signal generators. The driving signals TX1 to TX12 may correspond to three driving signal generator groups G1 to G3. In detail, the driving signals TX1 to TX4 may correspond to the driving signal generator group G1; the driving signals TX5 to TX8 may correspond to the driving signal generator group G2; and the driving signals TX9 to TX12 may correspond to the driving signal generator group G3. In this embodiment, numbers of driving signals in the driving signal generator groups G1 to G3 are same.

During a touch sensing operation, the driving signals TX1 to TX12 can be divided into a plurality of cycles along a time axis. The cycles respectively correspond to a plurality of time periods TP1 to TP4. In the time period TP1, the driving signals TX1, TX5 and TX9 are enabled and has an amplitude swing between two different voltages, and the other driving signals TX2 to TX4, TX6 to TX8 and TX10 to TX12 are disabled and kept on a reference voltage. In the time period TP2, the driving signals TX2, TX6 and TX10 are enabled and has the amplitude swing between the two different voltages, and the other driving signals TX1, TX3 to TX5, TX7 to TX9, TX11 and TX12 are disabled and kept on the reference voltage. In the time period TP3, the driving signals TX3, TX7 and TX11 are enabled and has the amplitude swing between the two different voltages, and the other driving signals TX1, TX2, TX4 to TX6, TX8 to TX10 and TX12 are disabled and kept on the reference voltage. In the time period TP4, the driving signals TX4, TX8 and TX12 are enabled and has the amplitude swing between the two different voltages, and the other driving signals TX1 to TX3, TX5 to TX7 and TX9 to TX11 are disabled and kept on the reference voltage.

It should be noted here, in one of the time periods TP1 to TP4, only one driving signal is enabled in each of the driving signal generator groups G1 to G3. Moreover, the enabled driving signal correspond to the driving signal generator group G1 has a first frequency, the enabled driving signal correspond to the driving signal generator group G2 has a second frequency and the enabled driving signal correspond to the driving signal generator group G3 has a third frequency, wherein the first frequency, the second frequency and the third frequency are different.

It also should be noted here, in present embodiment, a number of driving signals can be enabled simultaneously during a same time period. For example, during the time period TP1, the driving signals TX1, TX5, TX9 are simultaneously enabled. Such as that, a time length for one frame of the touch sensing operation can be reduced. It can be seen in this embodiment, only 4 time periods TP1 to TP4 are needed rather than 12 time periods for the touch sensing operation of one frame.

Since a total sensing time can be saved, a time length of each of the time periods TP1 to TP4 can be increased. Such as that, a signal to noise ratio (SNR) of the driving signals TX1 to TX12 and corresponding sensing signals can be increased, and performance of the touch sensing operation can be enhanced.

On the other hand, in present disclosure, amplitudes of the enabled driving signals TX1 to TX12 may be same. Each of the enabled driving signals TX1 to TX12 may be a sine wave, square wave, triangle wave or any other periodical wave. Each of the driving signals TX1 to TX12 which is disabled may be kept on a ground voltage (=0V). Furthermore, number of driving signal generator groups may be set by a designer according to physical necessary, and no special limitation here.

In present embodiment, each of the drive signal generators may be implemented by a signal selector. The signal selector may select the ground voltage to generate the corresponding drive signal TX1 to TX12 when the drive signal TX1 to TX12 is disabled. The signal selector may select a pre-generated sine wave to generate the corresponding drive signal TX1 to TX12 when the drive signal TX1 to TX12 is enabled. The signal selector may be implemented by any signal multiplexing circuit well known by a person skilled in the art, and no more special limitation here.

Figure 3:
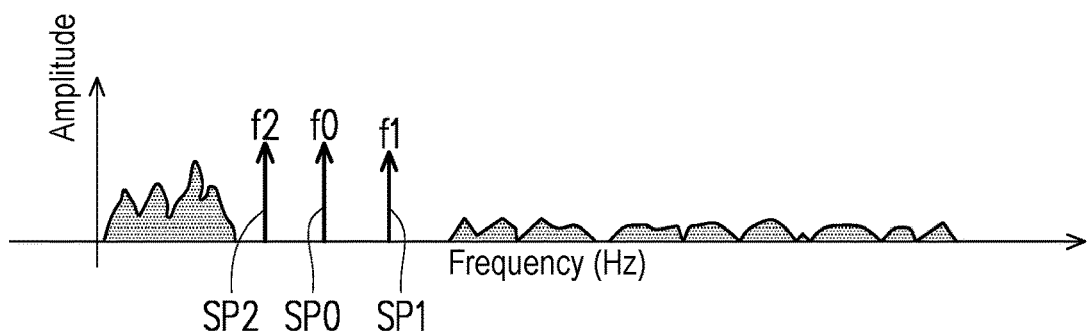
FIG. 3 is a spectrum diagram according to the embodiment of FIG. 2 of present disclosure.

Please refer to FIG. 3, which is a spectrum diagram according to the embodiment of FIG. 2 of present disclosure. According to the waveforms of FIG. 2, each of the enabled driving signals TX1 to TX4 corresponds to the driving signal generator group G1 has frequency f0; each of the enabled driving signals TX5 to TX8 corresponds to the driving signal generator group G2 has frequency f1; and each of the enabled driving signals TX9 to TX12 corresponds to the driving signal generator group G3 has frequency f2, wherein the frequency f2<the frequency f0<the frequency f1. There are three separately spectrums SP0 to SP2 respectively correspond to the frequencies f0 to f2 can be seen on the spectrum diagram.

In additional, the spectrum diagram in FIG. 3 can be obtained by performing Fourier transformation on the driving signals TX1 to TX12.

Figure 4:
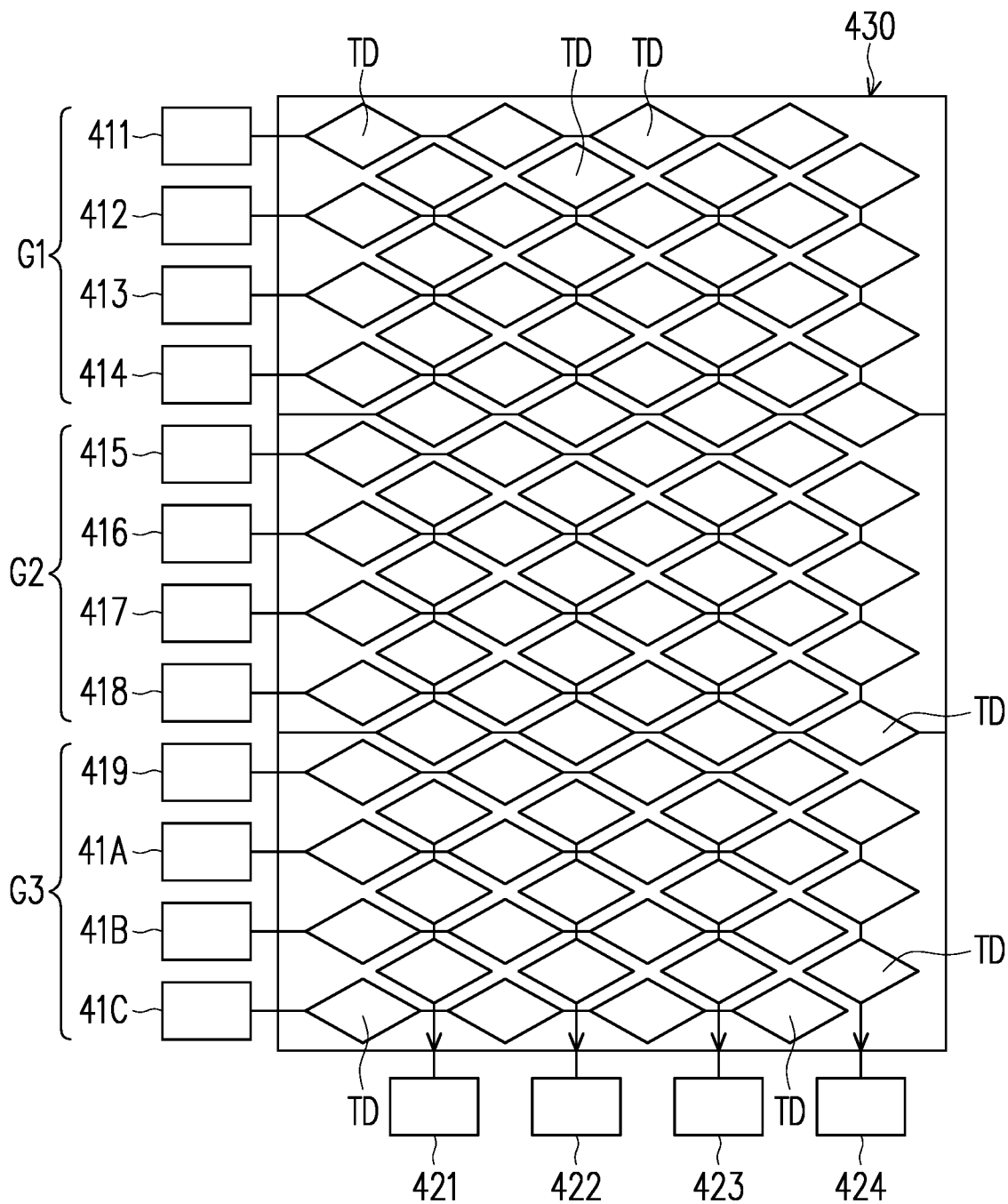
FIG. 4 is a schematic diagram of a touch sensing device according to an embodiment of present disclosure.

Please refer to FIG. 4, which is a schematic diagram of a touch sensing device according to an embodiment of present disclosure. The touch sensing device 400 includes a plurality of driving signal generators 411 to 41C, a plurality of sensing signal receivers 421 to 424 and a touch sensing pad array 430. The touch sensing pad array 430 includes a plurality of touch sensing pads TD. The touch sensing pads TD may arranged in an array. The driving signal generators 411 to 41C are coupled to the touch sensing pad array 430. The driving signal generators 411 to 41B respectively provide a plurality of driving signals to the corresponding touch sensing pads TD. The driving signal generators 411 to 414 are divided to a driving signal generator group G1; the driving signal generators 415 to 418 are divided to a driving signal generator group G2; and the driving signal generators 419 to 41C are divided to a driving signal generator group G3. The sensing signal receivers 421 to 424 are also coupled to the touch sensing pad array 430. Each of the sensing signal receivers 421 to 424 is configured to receive a sensing signal from corresponding touch sensing pads TD, and the sensing signal is generated by the corresponding touch sensing pads TD based on received driving signals.

Figure 5:
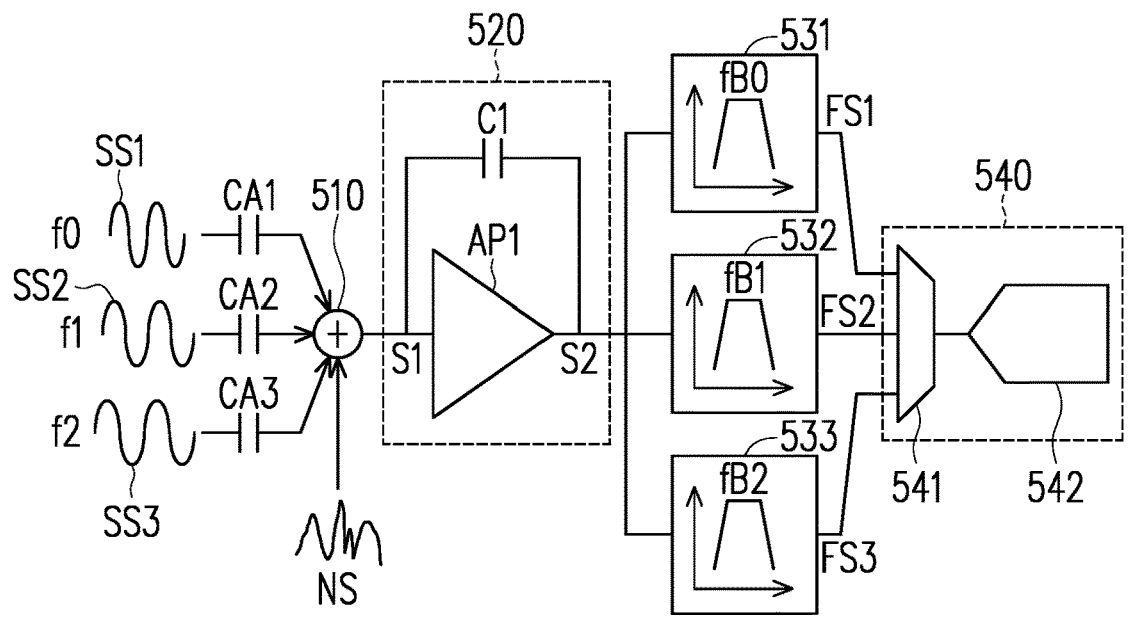
FIG. 5 illustrates a circuit diagram of each of the sensing signal receivers according to an embodiment of present disclosure.

Please refer to FIG. 5, which illustrates a circuit diagram of each of the sensing signal receivers according to an embodiment of present disclosure. Each of the sensing signal receiver 421 to 424 in FIG. 4 can be implemented by the sensing signal receiver 500 in FIG. 5. The sensing signal receiver 500 includes a signal adder 510, an analog front-end circuit 520, a plurality of filters 531 to 533 and a signal processing circuit 540. The signal adder 510 may receive a plurality of sensing signals SS1 to SS3 via a plurality of capacitors CA1 to CA3. The sensing signals SS1 to SS3 are respectively generated according to driving signals corresponding to different driving signal generator groups. Such as that, the sensing signals SS1 to SS3 may respectively have different frequency f0 to f2. The capacitors CA1 to CA3 are DC-decoupling capacitors, and DC components of the sensing signals SS1 to SS3 can be filtered out. In this embodiment, noise NS may also be received by the signal adder 510. The signal adder 510 summing the received signals and obtain a summation signal S1.

The analog front-end circuit 520 is coupled to an output end of the signal adder 510. The analog front-end circuit 520 may include a capacitor C1 and an amplifier AP1. The capacitor C1 is cross coupled between an input end and an output end of the amplifier AP1. The amplifier AP1 is configure to amplify the summation signal S1 to generate a processed signal S2. In this embodiment, the processed signal S2 may be composed by a plurality of parts having the frequencies f0, f1 and f2.

Besides, the filters 531 to 533 are coupled to the analog front-end circuit 520. The filters 531 to 533 respectively have a plurality of different filter bands fB0, fB1 and fB2. In this embodiment, any two of the filter bands fB0, fB1 and fB2 are not overlapped. Moreover, the filter bands fB0, fB1 and fB2 may be respectively set according to the frequencies f0 to f2 of the driving signals of the driving signal generator groups. Each of the frequencies f0 to f2 may be a middle frequency of each of the filter bands fB0, fB1 and fB2.

The filters 531 to 533 receive the processed signal S2 and respectively perform signal filtering operations on the processed signal S2 to respectively generate a plurality of filter signals FS1 to FS3, and provide the filter signals FS1 to FS3 to the signal processing circuit 540.

The signal processing circuit 540 may include a signal selector 541 and an analog to digital converter (ADC) 542. The signal selector 541 may select each of the filter signals FS1 to FS3 to provide to the ADC 542, and the ADC 542 may convert each of the filter signals FS1 to FS3 to a corresponding digital code. The sensing signal receiver 500 may generate touch sensing information according to the digital codes generated by the ADC 542.

In this embodiment, the signal adder 510 may be implemented by signal summation circuit well known by a person skilled in this art. The amplifier AP1 may also be implemented by any type of amplifier well known by a person skilled in this art. The filters 531 to 533 are narrow band filters, and also may be implemented by any well known narrow band filtering circuit, and no special limitation here.

Figure 6:
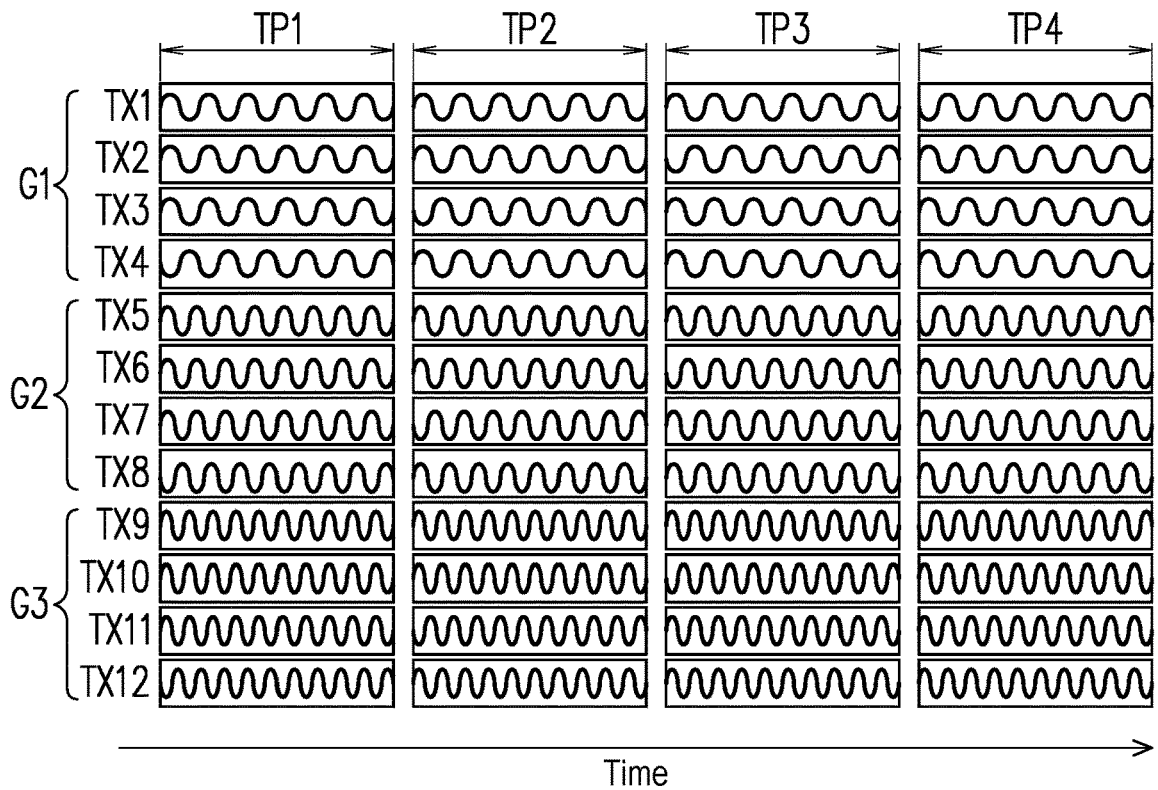
FIG. 6 illustrates waveform plots of driving signals generated by driving signal generators of touch detection circuit according to another embodiment of present disclosure.

Please refer to FIG. 6, which illustrates waveform plots of driving signals generated by driving signal generators of touch detection circuit according to another embodiment of present disclosure. In this embodiment, a plurality of driving signals TX1 to TX12 are generated by a plurality of driving signal generators, and the driving signals TX1 to TX12 may correspond to three driving signal generator groups G1 to G3.

During a touch sensing operation, the driving signals TX1 to TX12 can be divided into a plurality of cycles along a time axis. The cycles respectively correspond to a plurality of time periods TP1 to TP4. In this embodiment, the driving signals TX1 to TX12 are always enabled during all of the time periods TP1 to TP4. Furthermore, in each of the driving signal generator groups G1 to G3, at least one of the driving signals TX1 to TX12 has a first phase during each of the time periods TP1 to TP4, and the other driving signals TX1 to TX12 have a second phase during each of the time periods TP1 to TP4, wherein the first phase is different from the second phase.

In detail, during the time period TP1, in the driving signal generator group G1, the driving signal TX4 has a first phase (i.e. a negative phase), and the other driving signals TX1 to TX3 have a second phase (i.e. a positive phase). During the time period TP1, in the driving signal generator group G2, the driving signal TX8 has the negative phase, and the other driving signals TX5 to TX7 have the positive phase. Moreover, during the time period TP1, in the driving signal generator group G3, the driving signal TX12 has the negative phase, and the other driving signals TX9 to TX11 have the positive phase.

During the next time period TP2, the driving signal with the first phase may be changed in each of the driving signal generator groups G1 to G3. In this embodiment, during the time period TP2, the driving signals TX3, TX7 and TX11 are adjusted to the negative phase, and the other driving signals TX1 to TX2, TX4 to TX6, TX8 to TX10 and TX12 have the positive phase. During the time period TP3, the driving signals TX2, TX6 and TX10 are adjusted to the negative phase, and the other driving signals TX1, TX2 to TX5, TX7 to TX9, TX11 and TX12 have the positive phase. Moreover, during the time period TP4, the driving signals TX1, TX5 and TX9 are adjusted to the negative phase, and the other driving signals TX2 to TX4, TX6 to TX8 and TX10 to TX12 have the positive phase.

In this embodiment, one frame of a touch sensing operation can be completed from the time period TP1 to the time period TP4.

It should be noted here, the driving signals TX1 to TX12 of same driving signal generator group G1 to G3 may have same frequency. A frequency of the driving signals TX1 to TX4 corresponding to the driving signal generator group G1 may be a first frequency; a frequency of the driving signals TX5 to TX8 corresponding to the driving signal generator group G2 may be a second frequency; and a frequency of the driving signals TX9 to TX12 corresponding to the driving signal generator group G3 may be a third frequency, wherein the first frequency, the second frequency and the third frequency are different. In this embodiment, the first frequency<the second frequency<the third frequency.

It should be noted here, in this embodiment, for example, each of the driving signal generator may receive two signals respectively have the first phase and the second phase. Each of the driving signal generator may receive one of the two signals to generate corresponding driving signal. The signal selection operation may be performed by a signal multiplexer which is well known by a person skilled in the art.

Figure 7:
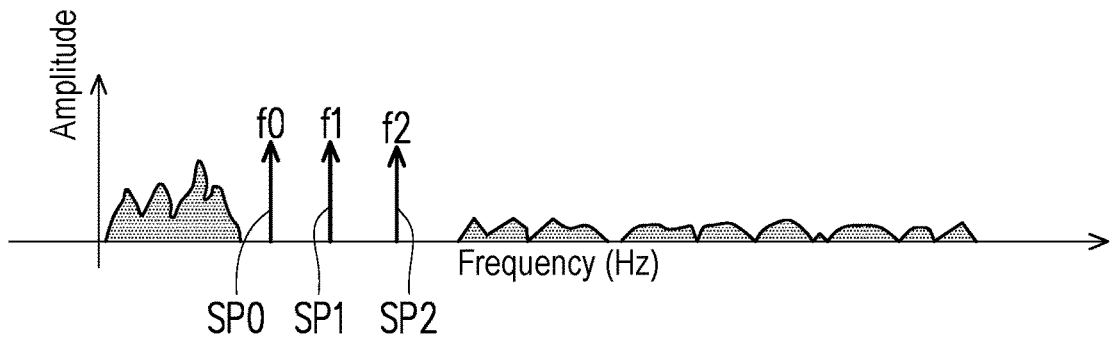
FIG. 7 is a spectrum diagram according to the embodiment of FIG. 6 of present disclosure.

Please refer to FIG. 7, which is a spectrum diagram according to the embodiment of FIG. 6 of present disclosure. According to the waveforms of FIG. 6, each of the enabled driving signals TX1 to TX4 corresponds to the driving signal generator group G1 has frequency f0; each of the enabled driving signals TX5 to TX8 corresponds to the driving signal generator group G2 has frequency f1; and each of the enabled driving signals TX9 to TX12 corresponds to the driving signal generator group G3 has frequency f2, wherein the frequency f2>the frequency f1>the frequency f0. There are three separately spectrums SP0 to SP2 respectively correspond to the frequencies f0 to f2 can be seen on the spectrum diagram.

The spectrum diagram in FIG. 7 can be obtained by performing Fourier transformation on the driving signals TX1 to TX12.

Figure 8:
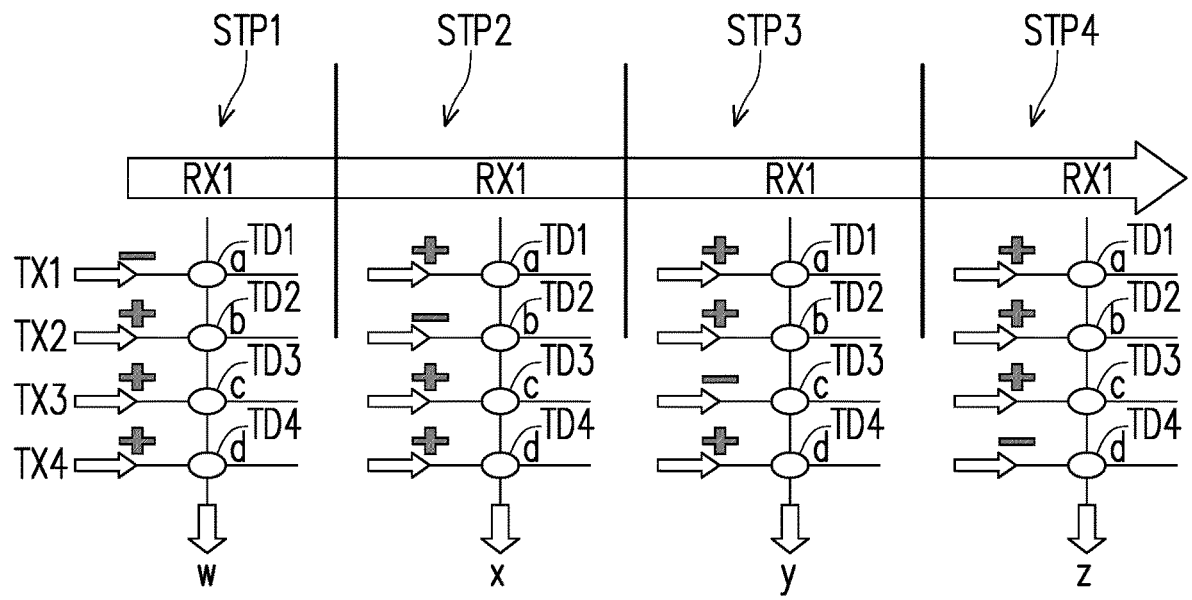
FIG. 8 illustrates a schematic diagram for touch sensing operation according to an embodiment of present disclosure.

Please refer to FIG. 6 and FIG. 8 commonly, wherein FIG. 8 illustrates a schematic diagram for touch sensing operation according to an embodiment of present disclosure. In FIG. 8, during the touch sensing period STP1, the driving signals TX1-TX4 with phases −, +, +, + can be transported to touch sensing pads TD1-TD4. A sensing signal receiver RX1 corresponding to the touch sensing pads TD1-TD4 can receive sensing signal w from the touch sensing pads TD1-TD4 during the touch sensing period STP1. During the touch sensing period STP2, the driving signals TX1-TX4 with phases +, −, +, + can be transported to touch sensing pads TD1-TD4. The sensing signal receiver RX1 can receive sensing signal x from the touch sensing pads TD1-TD4 during the touch sensing period STP2. During the touch sensing period STP3, the driving signals TX1-TX4 with phases +, +, −, + can be transported to touch sensing pads TD1-TD4. The sensing signal receiver RX1 can receive sensing signal y from the touch sensing pads TD1-TD4 during the touch sensing period STP3. Moreover, during the touch sensing period STP4, the driving signals TX1-TX4 with phases +, +, +, − can be transported to touch sensing pads TD1-TD4. The sensing signal receiver RX1 can receive sensing signal z from the touch sensing pads TD1-TD4 during the touch sensing period STP4. In this embodiment, the sensing signals w, x, y, z can be generated according to corresponding driving signals TX1 to TX4 and capacitance variation values a, b, c, d of the touch sensing pads TD1-TD4, respectively.

A relationship between the sensing signals w, x, y, z and the capacitance variation values a, b, c, d can be represented by a formulation shown as below:

$$\begin{bmatrix} -+++ \\ +-++ \\ ++-+ \\ +++- \end{bmatrix} \begin{bmatrix} a \\ b \\ c \\ d \end{bmatrix} = \begin{bmatrix} w \\ x \\ y \\ z \end{bmatrix}$$

By expanding the matrix operation shown above, equation set can be obtained as below:

$$\begin{cases} a = \frac{1}{4}(-w + x + y + z) \\ b = \frac{1}{4}(w - x + y + z) \\ c = \frac{1}{4}(w + x - y + z) \\ d = \frac{1}{4}(w + x + y - z) \end{cases}$$

Such as that, by the equation set shown above, the capacitance variation values a, b, c, d can be obtained, and touching information can be generated according to the capacitance variation values a, b, c, d.

It should be noted here, in this embodiment, one of the driving signals TX1-TX4 is selected to have a different phase (the first phase). In some other embodiments, two or more of the driving signals TX1-TX4 may be selected to has the first phase. Furthermore, one signal generator group may have two or more driving signal generators. The 4 driving signal generators in one signal generator group in present embodiment is just an example for illustration, and not limit an invention scope of present disclosure.

Figure 9:
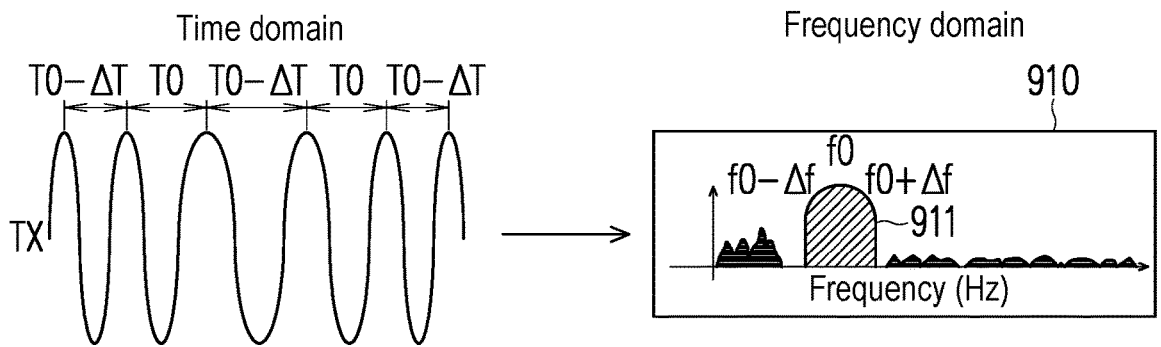
FIG. 9 illustrates a schematic plot of a waveform of the driving signal according to another embodiment of present disclosure.

Please refer to FIG. 9, which illustrates a schematic plot of a waveform of the driving signal according to another embodiment of present disclosure. In FIG. 9, a frequency of the driving signal TX may not be fixed at a constant value, and may be adjusted within a frequency band by a spread spectrum mechanism. In time domain, a period of the driving signal TX may be T0–ΔT, and be adjusted to T0–T0+–ΔT–T0– and T0–ΔT in sequential. Such as that, the frequency, in frequency domain, may be varied within the frequency band 911 shown as in a spectrum diagram 910. A lower bond of the frequency band 911 is f0–Δf; an upper bond of the frequency band 911 is f0+Δf; and a middle frequency of the frequency band 911 is f0. Wherein, f0=1/T0; f0+Δf=1/(T0+ΔT); and f0–Δf=1/(T0–ΔT).

The waveform of the driving signal TX in FIG. 9 can be applied to every embodiment of present disclosure mentioned above. The waveform of the driving signal TX can be generated by any spread spectrum circuit well known by a person skilled in the art, and no more special limitation here.

Figure 10:
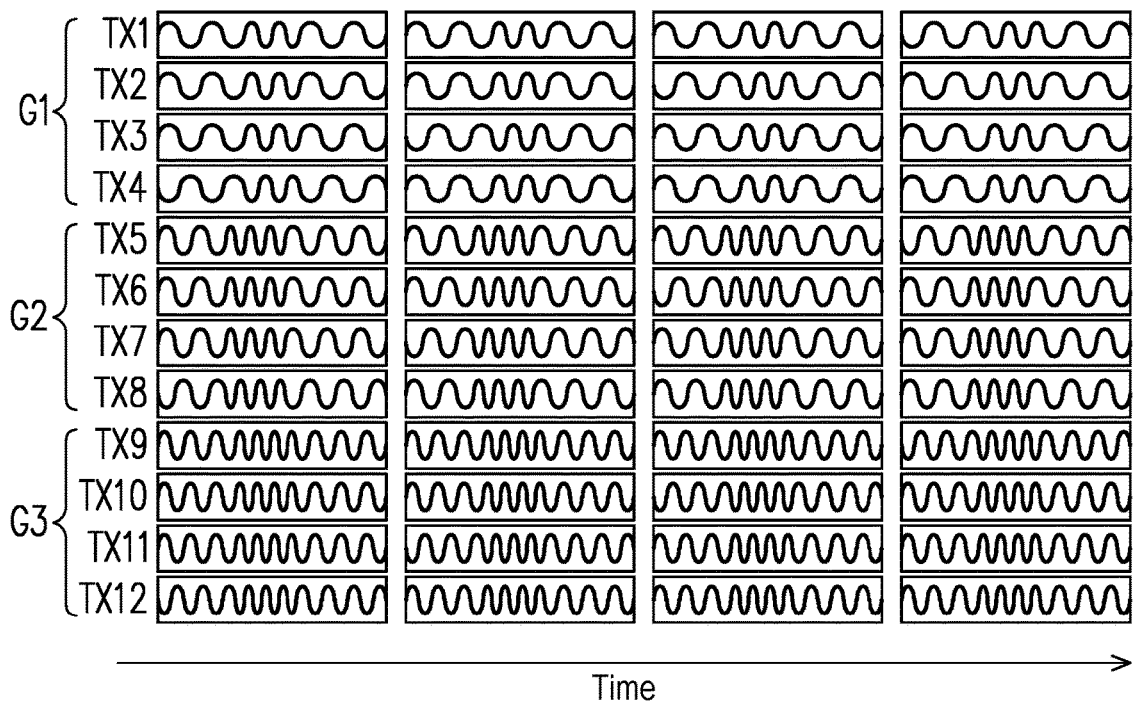
FIG. 10 illustrates a waveform plots of driving signals generated by driving signal generators of touch detection circuit according to another embodiment of present disclosure.

Please refer to FIG. 10, which illustrates a waveform plots of driving signals generated by driving signal generators of touch detection circuit according to another embodiment of present disclosure. In this embodiment, a plurality of driving signals TX1 to TX12 are generated by a plurality of driving signal generators, and the driving signals TX1 to TX12 may correspond to three driving signal generator groups G1 to G3.

In FIG. 10, a spread spectrum scheme as mentioned in the embodiment of FIG. 9 may be applied to generate the driving signals TX1 to TX12. In the embodiment, frequency of the driving signals TX1 to TX4 of the driving signal generator group G1 is modulated within a first frequency band; frequency of the driving signals TX5 to TX8 of the driving signal generator group G2 is modulated within a second frequency band; and, frequency of the driving signals TX9 to TX12 of the driving signal generator group G3 is modulated within a third frequency band, wherein the first frequency band, the second frequency band and the third frequency band are not overlapped.

Figure 11:
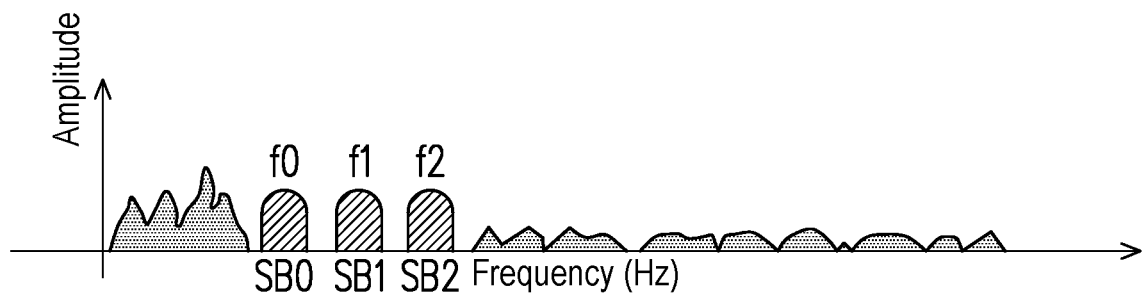
FIG. 11 illustrates a spectrum diagram according to the embodiment of FIG. 10 of present disclosure.

Please refer to FIG. 11, which illustrates a spectrum diagram according to the embodiment of FIG. 10 of present disclosure. In FIG. 11, the first frequency band SB0 has a middle frequency f0, the second frequency band SB1 has a middle frequency f1, and the third frequency band SB2 has a middle frequency f2. The frequency f0 is smaller than the frequency f1, and the frequency f1 is smaller than the frequency f2.

The spectrum diagram of FIG. 11 may be generated by performing Fourier transformation on the driving signals TX1 to TX12.

In summary, present disclosure divides the driving signal generators into a plurality of driving signal generator groups, and the driving signal generators of different driving signal generator groups respectively generate the driving signals with different frequency. Such as that, total time length for the touch sensing operation can be saved, so that a time length for sensing operation of one channel may be increased. Such as that, a signal to noise ratio (SNR) of the driving signals and corresponding sensing signals can be increased, and performance of the touch sensing operation can be enhanced, and performance of touch sensing operation can be enhanced, too.

What is claimed is:

1. A touch detection circuit, comprising:
a plurality of driving signal generators, wherein the plurality of driving signal generators are divided into a plurality of driving signal generator groups, each of the plurality of driving signal generator groups comprises at least one of the driving signal generators,
wherein the plurality of driving signal generators respectively generate a plurality of driving signals, and a frequency of each of the driving signals in one of the plurality of driving signal generator groups is different from a frequency of each of the plurality of driving signals in another one of the plurality of driving signal generator groups,
wherein in each of the plurality of driving signal generator groups, the plurality of driving signals are divided into at least one first driving signal and a plurality of second driving signals, waveforms of the plurality of second driving signals are same, and waveform of the at least one first driving signal is different from the waveforms of the plurality of second driving signals,
wherein the plurality of driving signal generators respectively provide the plurality of driving signals to a plurality of touch sensing pads; and
a plurality of sensing signal receivers, respectively receiving a plurality of sensing signals from corresponding touch sensing pads, and generating touch sensing information according to the plurality of sensing signals,
wherein each of the plurality of signal sensing receiver comprises:
a signal adder, summing the corresponding sensing signal to obtain a summation signal;
an analog front-end circuit, coupled to the signal adder, processing the summation signal to generate a processed signal; and a plurality of filters, coupled to the analog front-end circuit, wherein the plurality of filters respectively perform signal filtering operations on the processed signal to respectively generate a plurality of filter signals, wherein the plurality of filters respectively have a plurality of different filter bands, and any two of the plurality of filter bands are not overlapped, wherein the plurality of filter bands are respectively set according to the frequencies of the plurality of driving signals of the plurality of driving signal generator groups.

2. The touch detection circuit according to claim 1, wherein the frequencies of the plurality of driving signals in a same driving signal generator group are equaled.

3. The touch detection circuit according to claim 1, wherein the frequency of each of the plurality of driving signals in each of the plurality of driving signal generator groups is modulated within a frequency band.

4. The touch detection circuit according to claim 3, wherein the frequency of each of the plurality of driving signals in each of the plurality of driving signal generator groups is modulated is modulated according to a spread spectrum scheme.

5. The touch detection circuit according to claim 1, wherein each of the plurality of driving signal generators which is enabled generates a corresponding driving signal with amplitude swing between a first voltage and a second voltage, wherein the first voltage and the second voltage are different.

6. The touch detection circuit according to claim 5, wherein each of the plurality of driving signal generators which is disabled generates the corresponding driving signal with amplitude kept on a reference voltage.

7. The touch detection circuit according to claim 6, wherein at least two of the plurality of driving signal generators in different driving signal generator groups are simultaneously enabled.

8. The touch detection circuit according to claim 1, wherein in each of the plurality of driving signal generator groups, at least one of the plurality of driving signals has a first phase and the other driving signals have a second phase, and the first phase is different from the second phase.

9. The touch detection circuit according to claim 8, wherein each of the plurality of driving signals has the first phase in a first time period, and has the second phase in a plurality of second time periods.

10. The touch detection circuit according to claim 1, wherein the plurality of filters are narrow band filters.

11. The touch detection circuit according to claim 1, wherein each of the plurality of signal sensing receiver further comprises:

a signal processing circuit, receiving the plurality of filter signals, performing an operation on the plurality of filter signals to obtain the touch sensing information.

* * * * *